United States Patent
Yamagishi et al.

(10) Patent No.: US 11,182,466 B2
(45) Date of Patent: Nov. 23, 2021

(54) USER AUTHENTICATION APPARATUS AND RECORDING MEDIA

(71) Applicant: Soliton Systems K.K., Tokyo (JP)

(72) Inventors: Makoto Yamagishi, Tokyo (JP); Kenji Ikeda, Tokyo (JP); Kazuhiro Uehara, Machida (JP)

(73) Assignee: Soliton Systems K.K., Tokyo (JP)

( * ) Notice: Subject to any disclaimer, the term of this patent is extended or adjusted under 35 U.S.C. 154(b) by 0 days.

(21) Appl. No.: 17/041,232

(22) PCT Filed: May 19, 2020

(86) PCT No.: PCT/JP2020/019833
§ 371 (c)(1),
(2) Date: Jan. 26, 2021

(87) PCT Pub. No.: WO2021/053882
PCT Pub. Date: Mar. 25, 2021

(65) Prior Publication Data
US 2021/0157894 A1    May 27, 2021

(30) Foreign Application Priority Data

Sep. 18, 2019  (JP) ................................ 2019-168906

(51) Int. Cl.
*G06K 7/14*    (2006.01)
*G06K 9/00*    (2006.01)
(Continued)

(52) U.S. Cl.
CPC ........... *G06F 21/36* (2013.01); *G06K 7/1417* (2013.01); *G06K 9/00268* (2013.01)

(58) Field of Classification Search
CPC ........... G06K 9/00617; G06K 9/00597; G06K 7/1417; G06K 9/00268; G06K 9/00885;
(Continued)

(56) References Cited

U.S. PATENT DOCUMENTS 6,572,025 B1 *  6/2003  Nishikado .............. G06K 1/123
                                                    235/494
10,282,531 B1 *  5/2019  Davey ..................... G06F 21/42
(Continued)

FOREIGN PATENT DOCUMENTS

JP    1999-73504 A    3/1999
JP    2002-119576 A    4/2002
(Continued)

OTHER PUBLICATIONS

Chameleon code: Face Recognition Package Software, "NeoFace KAOATO," NEC Solution Innovator, retrieved from internet at http://www.nec-solutioninnovators.co.jp/sl/kaoato/cc.html on Jul. 15, 2020.
(Continued)

*Primary Examiner* — Siamak Harandi
(74) *Attorney, Agent, or Firm* — Alston & Bird LLP

(57) ABSTRACT

A user authentication apparatus includes a photographing unit which photographs a two-dimensional code displayed on a user authentication support terminal, wherein the two-dimensional code is formed by encoding at least first identification information that uniquely identifies the user, and second identification information that uniquely identifies all user authentication performed using the user authentication support terminal collectively, into the two-dimensional code, an authentication factor acquisition unit which acquires an authentication factor, a decoding unit which acquires the first identification information and the second identification information by decoding the two-dimensional code, a first identification information inquiry unit which inquires as to an existence of the first identification information by referring to a storage unit, a second identification information collation unit which, when the inquiry issued by the first identification information inquiry unit is successful, reads from the storage unit the second identification infor- (Continued)

mation and collates the second identification information acquired by the decoding unit with the second identification information read from the storage unit, an authentication factor collation unit which, when the inquiry issued by the first identification information inquiry unit is successful, reads from the storage unit the authentication factor and collates the authentication factor acquired by the authentication factor acquisition unit with the authentication factor read from the storage unit, and a determination unit which determines that authentication of the user has been performed successfully when the collation performed by both the second identification information collation unit and the authentication factor collation unit are successful.

9 Claims, 15 Drawing Sheets

(51) Int. Cl.
*G06F 21/31* (2013.01)
*G06F 21/36* (2013.01)

(58) Field of Classification Search
CPC .......... G06F 21/36; G06F 21/31; G06F 21/32; G06F 2221/2117; G06T 7/00
See application file for complete search history.

(56) References Cited

U.S. PATENT DOCUMENTS

| | | | |
|---|---|---|---|
| 2004/0015702 A1* | 1/2004 | Mercredi | G06F 21/32 |
| | | | 713/182 |
| 2006/0204048 A1* | 9/2006 | Morrison | G07C 9/29 |
| | | | 382/115 |
| 2016/0219047 A1* | 7/2016 | Jayaraman | A61B 5/378 |
| 2020/0042722 A1* | 2/2020 | Bikumala | H04L 9/065 |
| 2020/0329031 A1* | 10/2020 | Hashimoto | G06F 21/32 |

FOREIGN PATENT DOCUMENTS

| | | |
|---|---|---|
| JP | 2004-265231 A | 9/2004 |
| JP | 3982195 B | 7/2007 |
| JP | 2008-059183 A | 3/2008 |
| JP | 2008-083953 A | 4/2008 |
| JP | 4175056 B | 8/2008 |
| JP | 2008-305400 A | 12/2008 |
| JP | 4521086 B | 5/2010 |
| JP | 2011-090589 A | 5/2011 |
| JP | 2012-009051 A | 1/2012 |
| JP | 5045128 B | 7/2012 |
| JP | 5531963 B | 5/2014 |
| JP | 5606382 B | 9/2014 |
| JP | 2015-88080 A | 5/2015 |
| JP | 2016-222243 A | 12/2016 |
| JP | 2019-008513 A | 1/2019 |
| JP | 2019-032668 A | 2/2019 |
| JP | 2019-133314 A | 8/2019 |
| WO | WO 2002/025457 A1 | 3/2002 |
| WO | WO 2007/119818 A1 | 10/2007 |
| WO | WO 2016/059786 A1 | 4/2016 |

OTHER PUBLICATIONS

Manual for FOMA P901is, 05.5, Panasonic Mobile Communication Co., Ltd, May 2005, ver. 1.2. Part 1 of 6.
Manual for FOMA P901is, 05.5, Panasonic Mobile Communication Co., Ltd, May 2005, ver. 1.2. Part 2 of 6.
Manual for FOMA P901is, 05.5, Panasonic Mobile Communication Co., Ltd, May 2005, ver. 1.2. Part 3 of 6.
Manual for FOMA P901is, 05.5, Panasonic Mobile Communication Co., Ltd, May 2005, ver. 1.2. Part 4 of 6.
Manual for FOMA P901is, 05.5, Panasonic Mobile Communication Co., Ltd, May 2005, ver. 1.2. Part 5 of 6.
Manual for FOMA P901is, 05.5, Panasonic Mobile Communication Co., Ltd, May 2005, ver. 1.2. Part 6 of 6.
JP 2019-168906 Office Action dated Dec. 17, 2019.

* cited by examiner

USER AUTHENTICATION APPARATUS AND RECORDING MEDIA

CROSS REFERENCE TO RELATED APPLICATIONS

This application is a national stage application, filed under 35 U.S.C. § 371, of International Application No. PCT/JP2020/19833, filed May 19, 2020, which international application claims priority to and the benefit of Japanese Application No. 2019-168906, filed Sep. 18, 2019; the contents of both of which as are hereby incorporated by reference in their entireties.

BACKGROUND

Technical Field

The present invention relates to a user authentication apparatus and a recording media.

Description of Related Art

Elemental technology employed in user authentication can be broadly divided into the following three categories.

The first is user authentication by means of "possession". The user authentication by means of "possession" is a user authentication method in which a user in "possession" of a predetermined object serves as the authentication subject, wherein the predetermined object have initially been a key or a cash card from a bank in older times, and more recently been a security token implemented in an IC card, a USB dongle or the like. Furthermore, so-called SMS (short message service) authentication also corresponds to the user authentication by means of "possession", wherein a user in "possession" of a portable information terminal or the like that receives a predetermined message serves as the authentication subject.

The second is user authentication by means of "knowledge". The user authentication by means of "knowledge" is a user authentication method in which a user remembering predetermined information as "knowledge" serves as the authentication subject, wherein the predetermined information have initially been a secret word in older times, and now including a so-called PIN (Personal Identification Number) code, a password, a preset secret question and the answer thereto, and so on.

The third is user authentication by means of "biometrics". The user authentication by means of "biometrics" is a user authentication method based on collating information relating to user "biometrics" from which individual users can be identified, wherein the face, the iris, the retina, the vein, the fingerprint, the auricle of the ear, the shape of the palm, the voiceprint (the voice), handwriting, DNA, and so on are used as the biometric information.

FOMA P901iS Instruction Manual, NTT DoCoMo, November 2005, p. 342-344 discloses a portable telephone installed with two-step authentication technology in which, first, when a user presses a function unlock key, face authentication is performed, and when, as a result, the user photographed by a camera is determined to be the same person as a preregistered user, the user is requested to input a PIN, and then, when the input PIN matches a preregistered PIN, the functions are unlocked.

Japanese Patent Application Publication No. 2004-265231 discloses user authentication technology in which a user explicitly inputs ID information relating to the user him/herself either using an ID card or by means of key input, and then, instead of inputting a password, the face of the user is photographed. Face image data acquired as a result is then collated with face image data recorded in association with the ID information in advance, and when the collation is unsuccessful, the user who inputted the ID information is determined not to be the genuine user corresponding to the prerecorded face photograph data.

NeoFace KAOATO Room Entry/Exit Option 'Chameleon Code' available from NEC Solutions Innovators discloses technology in which an employee ID card or the like on which user identification information such as an employee number, for example, is printed (as a two-dimensional color barcode called "Chameleon Code") and the face of the user are photographed together, whereupon identity verification is performed by a double check in which both the face of the user and the employee ID card are authenticated.

BRIEF SUMMARY

The present invention has been designed to solve the problems in the prior art.

A user authentication apparatus serving as an aspect of the present invention includes a photographing unit which photographs a two-dimensional code displayed on a user authentication support terminal possessed by a user serving as an authentication subject, wherein the two-dimensional code is formed by encoding at least first identification information that uniquely identifies the user, and second identification information that is generated during registration of the user authentication support terminal and uniquely identifies all user authentication performed using the user authentication support terminal collectively, into the two-dimensional code, an authentication factor acquisition unit which acquires an authentication factor that differs from both the first identification information and the second identification information, a decoding unit which acquires the first identification information and the second identification information by decoding the two-dimensional code, a first identification information inquiry unit which inquires as to an existence of the first identification information by referring to a storage unit that stores, for the user, first identification information, an authentication factor associated with the first identification information, and second identification information associated with the first identification information, a second identification information collation unit which, when the inquiry issued by the first identification information inquiry unit is successful, reads from the storage unit the second identification information associated with the first identification information acquired by the decoding unit, and collates the second identification information acquired by the decoding unit with the second identification information read from the storage unit, an authentication factor collation unit which, when the inquiry issued by the first identification information inquiry unit is successful, reads from the storage unit the authentication factor associated with the first identification information acquired by the decoding unit, and collates the authentication factor acquired by the authentication factor acquisition unit with the authentication factor read from the storage unit, and a determination unit which determines that authentication of the user has been performed successfully when the collations performed by both the second identification information collation unit and the authentication factor collation unit are successful.

A recording media serving as an aspect of the present invention has a program for causing a computer to function as the respective units of the user authentication apparatus recorded thereon.

With the present invention, user authentication can be performed highly reliably by a simple operation.

DETAILED DESCRIPTION OF VARIOUS EMBODIMENTS

Embodiments of the present invention will be described in detail below with reference to the figures.

First Embodiment

Figure 1:
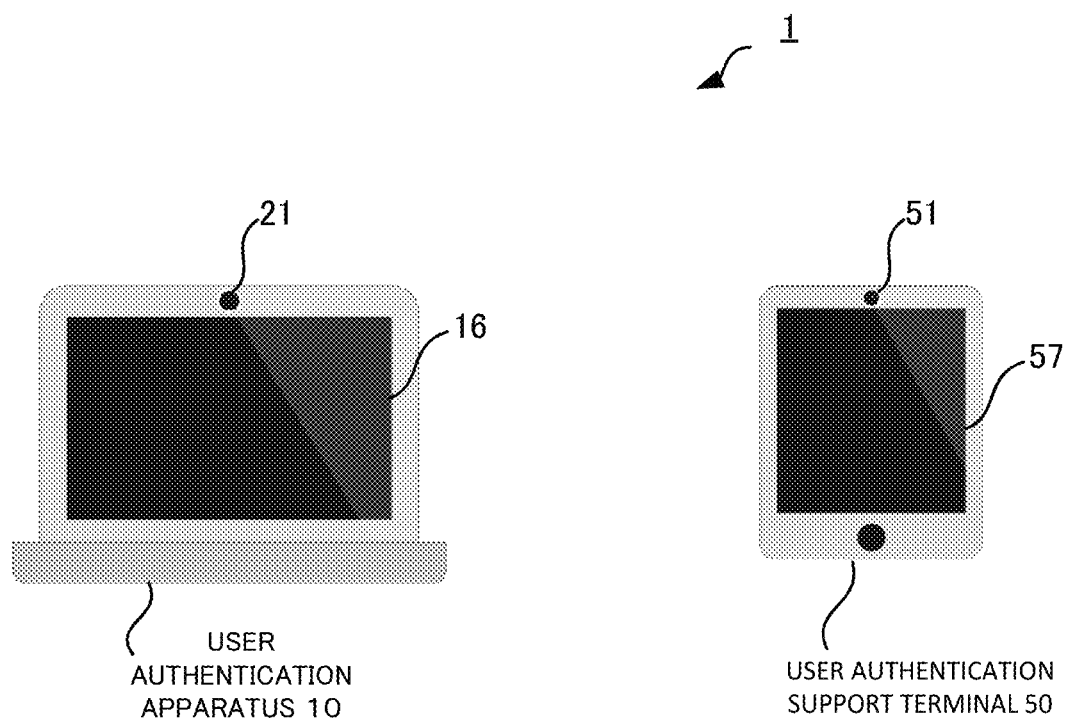
FIG. 1 is a schematic view of a user authentication system.

FIG. 1 is a schematic view of a user authentication system 1. The user authentication system 1 includes a user authentication apparatus 10 and a user authentication support terminal 50.

The user authentication apparatus 10 is, for example, a personal computer (PC) serving as a login target, on which a predetermined program (referred to hereafter as an "authentication application") is installed and executed. In other words, the user authentication apparatus 10 is incorporated into the login target PC. When a user performs a login operation, the user authentication apparatus 10 executes an authentication process through the authentication application, and when the authentication is successful, the user authentication apparatus 10 allows the user to log in.

The user who logs in to the user authentication apparatus 10 is in possession of the user authentication support terminal 50 and uses the user authentication support terminal 50 during user registration and authentication processes.

The user authentication support terminal 50 is, for example, a smartphone on which a predetermined program (referred to hereafter as an "authentication support application") is installed and executed.

Figure 2:
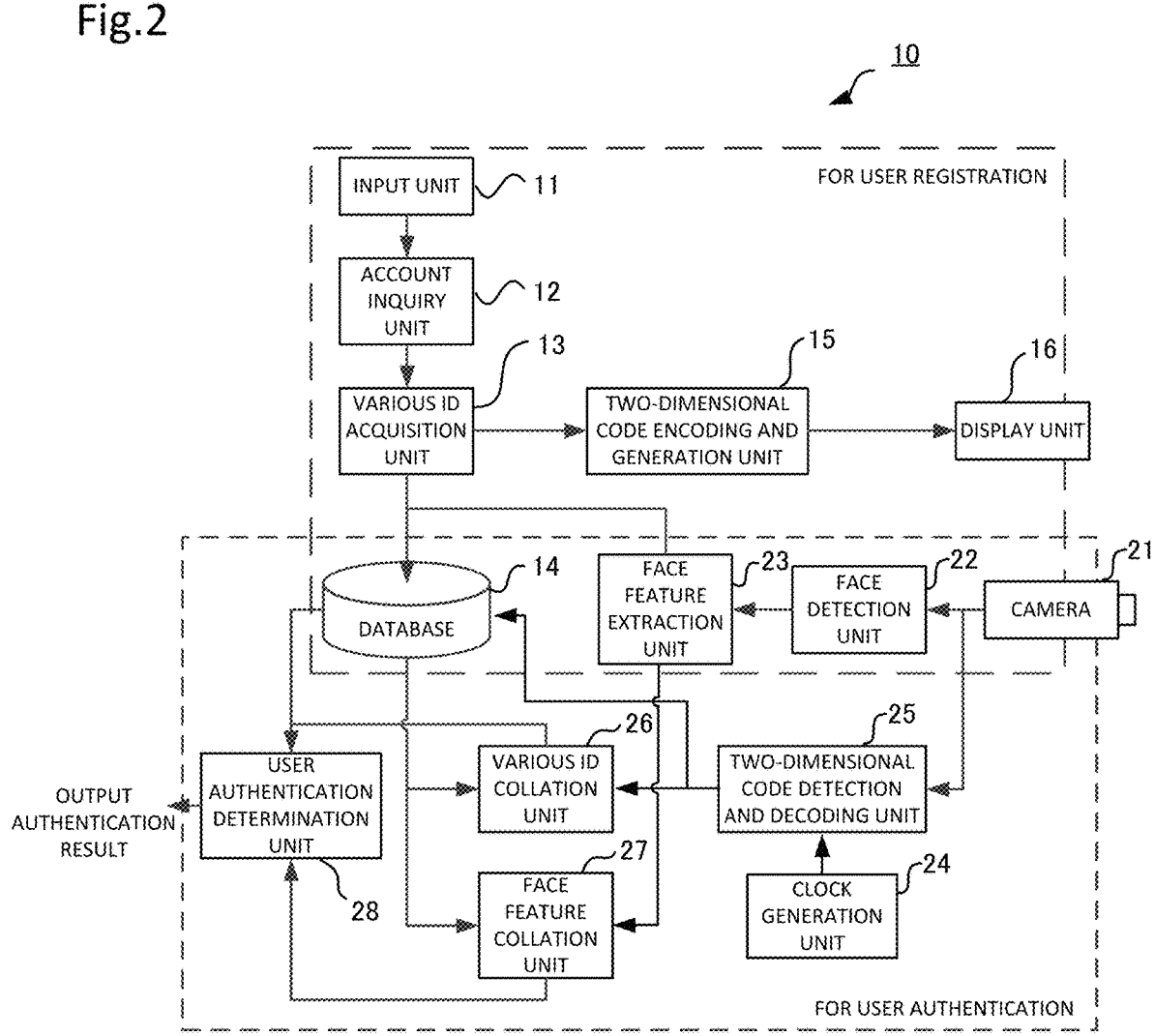
FIG. 2 is a block diagram showing a functional configuration of a user authentication apparatus.

FIG. 2 is a block diagram showing a functional configuration of the user authentication apparatus 10.

The user authentication apparatus 10 includes an input unit 11, an account inquiry unit 12, a various ID acquisition unit 13, a database 14, a two-dimensional code encoding and generation unit 15, a display unit 16, a camera 21, a face detection unit 22, a face feature extraction unit 23, a clock generation unit 24, a two-dimensional code detection and decoding unit 25, a various ID collation unit 26, a face feature collation unit 27, and a user authentication determination unit 28.

The input unit 11 is an interface on which to input information relating to user registration and user authentication. The input unit 11 includes, for example, an application activation button for activating the authentication application, and input fields for a login name and a password.

The account inquiry unit 12 inquires, on the basis of the login information input into the input unit 11, as to whether or not an account exists for a user of the authentication subject to be registered, and when the account exists, the account inquiry unit 12 acquires account information of the account.

The various ID acquisition unit 13 acquires an account name from the account information acquired by the account inquiry unit 12. Furthermore, the various ID acquisition unit 13 generates a session ID for uniquely identifying the user registration and a series of user authentication that follows the user registration collectively. Then, the various ID acquisition unit 13 stores the account name, which serves as a primary query key, and the session ID associated with the account name in the database 14.

Here, the session ID is unique identification information generated during the user registration process (for example, when a new user authentication support terminal 50 is registered in the user authentication apparatus 10, or when an existing user authentication support terminal 50 is re-registered in order to replace an authentication factor associated with the account name with a different authentication factor, and so on), and collectively identifies all user authentication processes relating to the user of the user authentication support terminal 50 used at the time of user registration.

The two-dimensional code encoding and generation unit 15 generates a various ID data group gathering together the account name and the session ID acquired by the various ID acquisition unit 13, and a license code read from the database 14, into one, and generates two-dimensional code image data by encoding the various ID data group into a two-dimensional code.

The display unit 16 corresponds, for example, to a display apparatus or a touch panel. The display unit 16 displays a two-dimensional code based on the two-dimensional code image data generated by the two-dimensional code encoding and generation unit 15.

The two-dimensional code detection and decoding unit 25 generates an encrypted various ID data group by detecting and decoding a two-dimensional code from an image generated by the camera 21. The two-dimensional code detection and decoding unit 25 then decrypts the encrypted various ID data group using a symmetric encryption key based on the license code read from the database 14, and extracts the account name, the session ID, and a time stamp therefrom.

Further, the two-dimensional code detection and decoding unit 25 determines an expiration time of the decryption using a time stamp supplied from the clock generation unit 24, and when the expiration time has not yet been reached, supplies the account name to the database 14 and provides the various ID collation unit 26 with the session ID.

The clock generation unit 24 issues the time stamp for determining the decryption expiration time to the two-dimensional code detection and decoding unit 25.

The various ID collation unit 26 acquires the session ID from the database 14 using the account name as a query key, collates the acquired session ID with the session ID supplied from the two-dimensional code detection and decoding unit 25, and notifies the user authentication determination unit 28 of the collation result.

The face feature collation unit 27 acquires registered face feature from the database 14 using the account name as a query key, collates the acquired face feature with face feature supplied from the face feature extraction unit 23, and notifies the user authentication determination unit 28 of the collation result.

The user authentication determination unit 28 determines whether or not to permit user authentication upon receipt of respective notifications from the database 14, the various ID collation unit 26, and the face feature collation unit 27, and outputs the authentication result to the outside.

The camera 21 photographs the face of the user at the time of user registration, and at the time of user authentication, the camera 21 generates an image by photographing a two-dimensional code displayed on a display unit 57 of the user authentication support terminal 50 and the face of the user either successively or simultaneously, and supplies the acquired image to the face detection unit 22 and the two-dimensional code detection and decoding unit 25.

The face detection unit 22 extracts a face region of the user from the image generated by the camera 21 and supplies the acquired face region image data to the face feature extraction unit 23.

The face feature extraction unit 23 extracts face feature from the face region image data supplied from the face detection unit 22. The face feature extraction unit 23 stores the extracted face feature in the database 14 in association with the account name at the time of user registration, and at the time of user authentication, the face feature extraction unit 23 supplies the extracted face feature to the face feature collation unit 27.

The database 14 stores the account name serving as the primary query key and various data associated with the account name.

Further, the database 14 stores a license code which is provided when the user authentication apparatus 10 is introduced, i.e., when the authentication application is installed in the login target PC.

Figure 3:
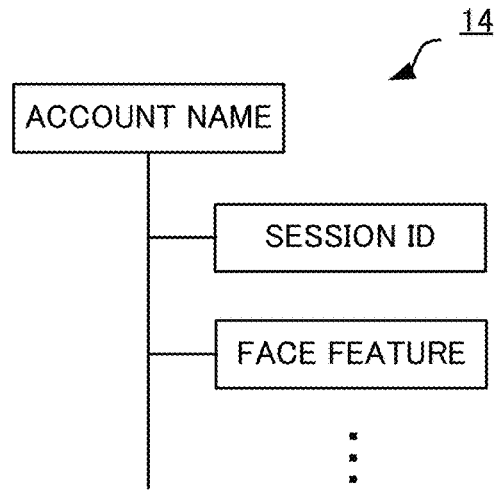
FIG. 3 is a schematic diagram showing a data structure of a database.

FIG. 3 is a schematic diagram showing a data structure of the database 14.

In the first embodiment, the database 14 stores the account name and the session ID acquired by the various ID acquisition unit 13 and the face feature supplied from the face feature extraction unit 23.

At the time of user registration, the database 14 stores a session ID supplied from the various ID acquisition unit 13 and face feature supplied from the face feature extraction unit 23 associatively in relation to the account name acquired by the various ID acquisition unit 13.

When, at the time of user authentication, the two-dimensional code detection and decoding unit 25 inquires as to an existence of the account name, the database 14 notifies the user authentication determination unit 28 of the inquiry result. Further, when the account name of the inquiry exists, the database 14 supplies the session ID associated with the account name to the various ID collation unit 26, and also supplies the face feature associated with the account name to the face feature collation unit 27.

A data query is performed in the database 14 using the account name as the primary query key. Thus, even when a large number of users are registered for the authentication subject, it is possible to conduct an unambiguous, high-speed query.

Figure 4:
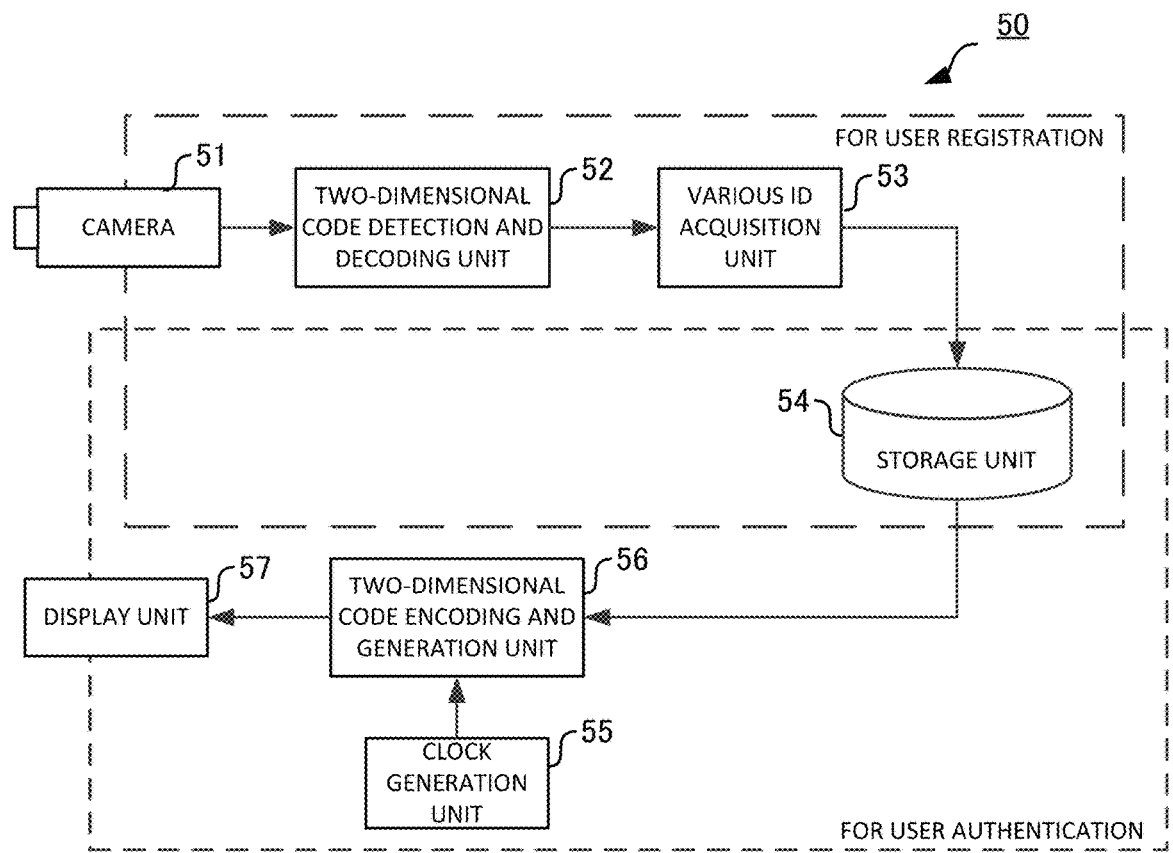
FIG. 4 is a block diagram showing a functional configuration of a user authentication support terminal.

FIG. 4 is a block diagram showing a functional configuration of the user authentication support terminal 50.

The user authentication support terminal 50 includes a camera 51, a two-dimensional code detection and decoding unit 52, a various ID acquisition unit 53, a storage unit 54, a clock generation unit 55, a two-dimensional code encoding and generation unit 56, and a display unit 57.

The camera 51 photographs the two-dimensional code displayed on the display unit 16 of the user authentication apparatus 10 and supplies the acquired image to the two-dimensional code detection and decoding unit 52.

The two-dimensional code detection and decoding unit 52 generates a various ID data group by detecting and decoding the two-dimensional code from the image acquired by the camera 51, and supplies the various ID data group to the various ID acquisition unit 53.

The various ID acquisition unit 53 extracts an account name, a session ID, and a license code from the various ID data group supplied from the two-dimensional code detection and decoding unit 52, and stores the extracted account name, session ID, and license code in the storage unit 54.

The two-dimensional code encoding and generation unit 56 generates a new various ID data group gathering together the account name and the session ID read from the storage unit 54 and a time stamp supplied from the clock generation unit 55 into one. The two-dimensional code encoding and generation unit 56 encrypts the new various ID data group using a symmetric encryption key based on the license code read from the storage unit 54, and also generates two-dimensional code image data resulted from the new various ID data group being encoded into a two-dimensional code.

At the time of user registration, the storage unit 54 stores the account name, the session ID, and the license code supplied from the various ID acquisition unit 53. At the time of user authentication, the storage unit 54 reads the account name, the session ID, and the license code, and supplies the read account name, session ID, and license code to the two-dimensional code encoding and generation unit 56.

The clock generation unit 55 generates a time stamp for determining the decryption expiration time and supplies the generated time stamp to the two-dimensional code encoding and generation unit 56.

The display unit 57 displays the two-dimensional code based on the two-dimensional code image data generated by the two-dimensional code encoding and generation unit 56.

Figure 5:
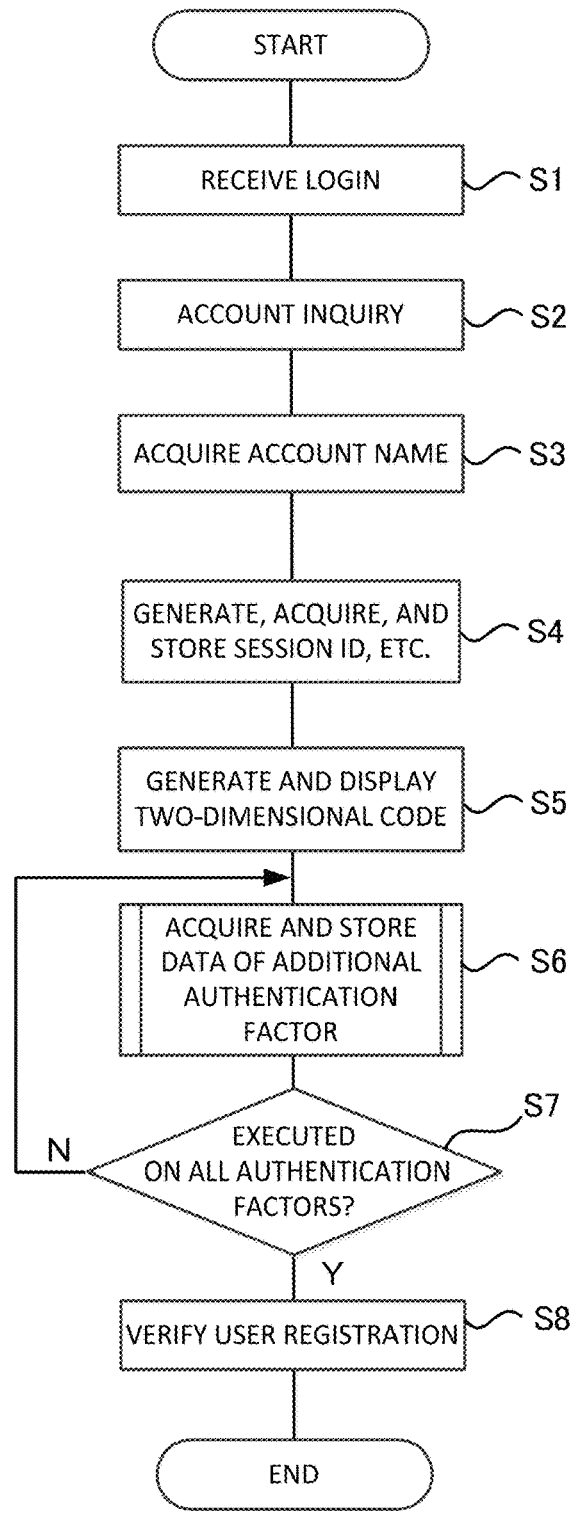
FIG. 5 is a flowchart showing a user registration process executed by the user authentication apparatus.

FIG. 5 is a flowchart showing a user registration process executed by the user authentication apparatus 10.

The user registration process is executed only once prior to user authentication which is to be described below, in order to register the user authentication support terminal 50 to be used for user authentication in the user authentication apparatus 10.

In step S1, the authentication application of the user authentication apparatus 10 is activated in response to an operation by a user. Then, when the login information (the login name and password) of the user is input into the input unit 11, the account inquiry unit 12 receives the login information.

In step S2, the account inquiry unit 12 inquires of the login target PC into which the user authentication apparatus 10 is incorporated as to whether or not an account exists for the user corresponding to the login information input into the input unit 11. When the account exists on the login target PC for the user corresponding to the input login information, the various ID acquisition unit 13 acquires the account information of the account from an account management unit (not shown) of the login target PC.

In step S3, the various ID acquisition unit 13 acquires an account name from the acquired account information.

In step S4, the various ID acquisition unit 13 generates a session ID and stores the session ID in the database 14 in association with the account name serving as the primary query key.

Note that when the same account name as that whose data to be stored already exists in the database 14 and overwrite updates are permitted, the data associated with the account name are respectively updated by being overwritten.

In step S5, the two-dimensional code encoding and generation unit 15 reads a license code from the database 14, generates a various ID data group gathering together the account name, the session ID, and the license code into one, and generates two-dimensional code image data by encoding the generated various ID data group into a two-dimensional code. The display unit 16 displays the two-dimensional code based on the two-dimensional code image data generated by the two-dimensional code encoding and generation unit 15.

In step S6, the various ID acquisition unit 13 determines whether or not an additional authentication factor (face feature, for example) exists. When an additional authentication factor exists, the various ID acquisition unit 13 acquires data of the additional authentication factor, associates the data with the account name, and stores the resulting data in the database 14. Note that specific processing executed in step S6 when the additional authentication factor is face feature will be described below.

In step S7, the various ID acquisition unit 13 determines whether or not the processing of step S6 has been executed on all additional authentication factors, advances to step S8 if so, and returns to step S6 if not.

In step S8, user registration is verified. Here, the user authentication process to be described below is executed.

Figure 6:
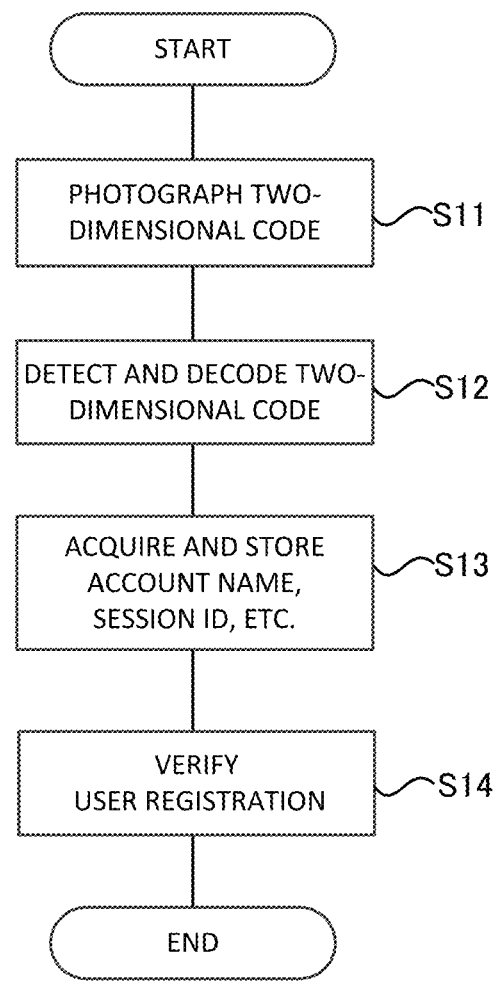
FIG. 6 is a flowchart showing a user registration process executed by the user authentication support terminal.

FIG. 6 is a flowchart showing a user registration process executed by the user authentication support terminal 50.

Note that, for now, step S5 of FIG. 5 has been already executed by the user authentication apparatus 10 so that the two-dimensional code is displayed on the display unit 16.

In step S11, the authentication support application of the user authentication support terminal 50 is activated in response to an operation by the user, and when "user registration" is selected on the authentication support application, the camera 51 begins photography. At this time, the user orients the camera 51 of the user authentication support terminal 50 toward the display unit 16 of the user authentication apparatus 10. As a result, the camera 51 photographs the two-dimensional code.

In step S12, the two-dimensional code detection and decoding unit 52 generates a various ID data group (comprising an account name, a session ID, and a license code) by detecting and decoding the two-dimensional code based on image data acquired by the camera 51.

In step S13, the various ID acquisition unit 53 extracts the account name, the session ID, and the license code from the various ID data group supplied from the two-dimensional code detection and decoding unit 52, and stores the extracted account name, session ID, and license code in the storage unit 54.

In step S14, the user registration is verified. Here, the user authentication process to be described below is executed.

Figure 7:
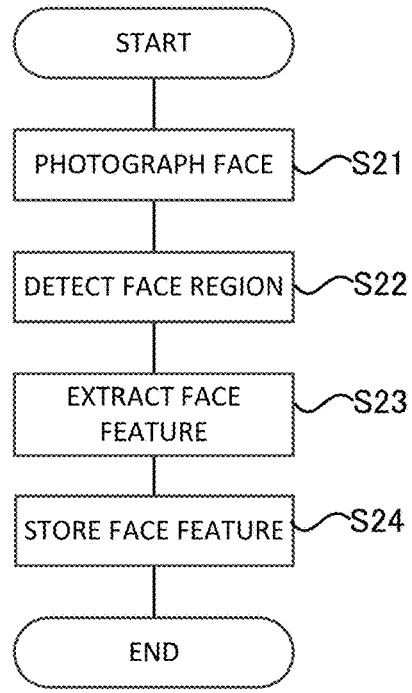
FIG. 7 is a flowchart showing specific processing executed in step S6.

FIG. 7 is a flowchart showing the specific processing executed in step S6 of FIG. 5. More specifically, in step S6, the following processing is executed when the additional authentication factor is face feature.

In step S21, the camera 21 of the user authentication apparatus 10 generates image data by photographing a face of the user.

In step S22, the face detection unit 22 detects a face region from the image data generated by the camera 21.

In step S23, the face feature extraction unit 23 extracts face feature from the face region of the image data.

In step S24, since the face feature exists as the additional authentication factor, the various ID acquisition unit 13 stores the acquired face feature in the database 14 in association with the account name.

Figure 8:
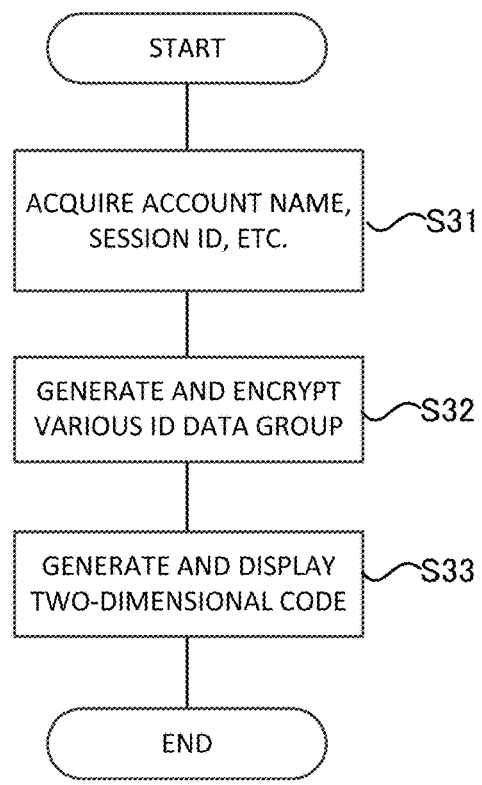
FIG. 8 is a flowchart showing a user authentication process executed by the user authentication support terminal.

FIG. 8 is a flowchart showing a user authentication process executed by the user authentication support terminal 50.

In step S31, the authentication support application of the user authentication support terminal 50 is activated in response to an operation by the user, and when "authentication" is selected on the authentication support application, the two-dimensional code encoding and generation unit 56 acquires the account name, the session ID, and the license code from the storage unit 54.

In step S32, the two-dimensional code encoding and generation unit 56 further generates a symmetric encryption key based on the license code read from the storage unit 54. The two-dimensional code encoding and generation unit 56 then encrypts a new various ID data group gathering together the account name and the session ID acquired in step S31, and a time stamp supplied from the clock generation unit 55 into one using the symmetric encryption key.

The new encrypted various ID data group (referred to hereafter as the "encrypted various ID data group") includes the time stamp and is therefore dependent on the generation time thereof. Hence, even if the symmetric encryption key itself is not time-dependent, the encrypted various ID data group has similar properties to a TOTP (Time-based One-Time Password). Alternatively, the two-dimensional code encoding and generation unit 56 may generate a time-dependent symmetric encryption key directly using a time stamp and generate the encrypted various ID data group using the time-dependent symmetric encryption key.

Note that as long as a symmetric encryption key is based on information shared between the user authentication apparatus 10 and the user authentication support terminal 50, there are no particular limitations thereon. For example, the symmetric encryption key may be an HOTP (an HMAC (Hash-based Message Authentication Codes)-based One-Time Password) that uses the number of past symmetric encryption key generations or the like as the shared information.

In step S33, the two-dimensional code encoding and generation unit 56 generates two-dimensional code image data by encoding the encrypted various ID data group into a two-dimensional code. The display unit 57 displays the two-dimensional code based on the image data generated by the two-dimensional code encoding and generation unit 56.

The user brings the display unit 57 of the user authentication support terminal 50 close to the front of the camera 21 of the user authentication apparatus 10. Further, when the user is seated directly in front of the user authentication apparatus 10 (the camera 21), the user may hold the two-dimensional code displayed on the display unit 57 alongside his/her own face while oriented toward the user authentication apparatus 10. Thus, as will be described in detail below, the two-dimensional code displayed on the display unit 57 is used in the authentication process executed by the user authentication apparatus 10.

Figure 9:
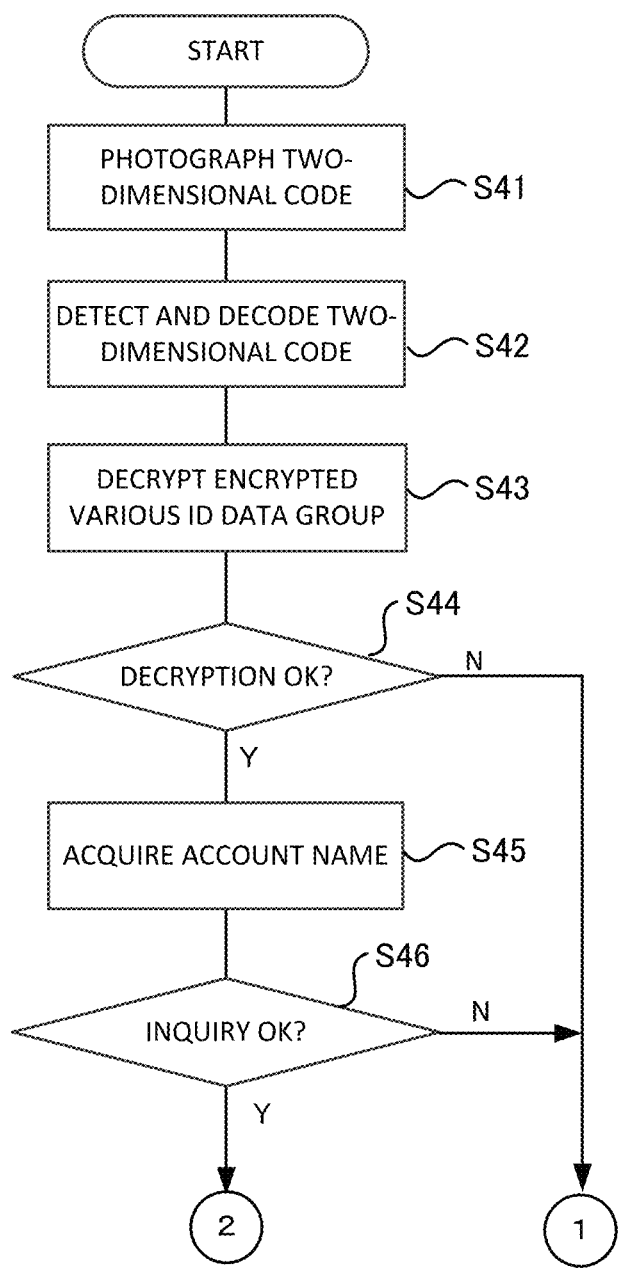
FIG. 9 is a first half portion of a flowchart showing a user authentication process executed by the user authentication apparatus.
Figure 10:
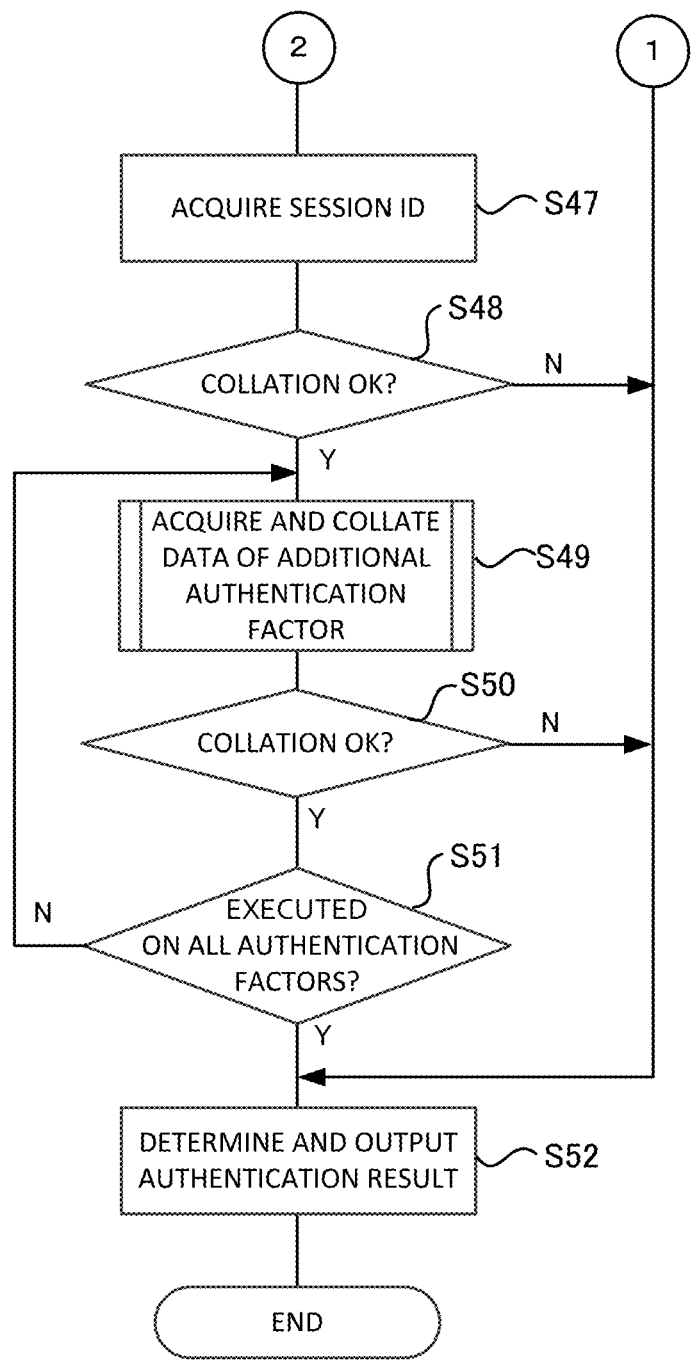
FIG. 10 is a second half portion of the flowchart showing the user authentication process executed by the user authentication apparatus.

FIGS. 9 and 10 are flowcharts showing the user authentication process executed by the user authentication apparatus 10.

In step S41, the authentication application of the user authentication apparatus 10 is activated in response to an operation by a user. Note that the authentication application may be activated at the same time as startup of the login target PC into which the user authentication apparatus 10 is incorporated. The camera 21 then photographs the two-dimensional code displayed on the display unit 57 of the user authentication support terminal 50 and generates image data.

In step S42, the two-dimensional code detection and decoding unit 25 generates an encrypted various ID data group by detecting and decoding the two-dimensional code based on the image data generated by the camera 21.

In step S43, the two-dimensional code detection and decoding unit 25 acquires a various ID data group by generating a symmetric encryption key based on the license code read from the database 14 and by executing a decryption process on the encrypted various ID data group using the symmetric encryption key.

In step S44, the two-dimensional code detection and decoding unit 25 determines whether or not the decryption process has been successful, advances to step S45 if so, and advances to step S52 if not.

Here, a case in which the symmetric encryption keys do not match, for example, corresponds to an example of failure of the decryption process. Further, a case in which the decryption process is successful and the various ID data group is acquired, but it is determined, from a result of a comparison between the time stamp included in the various ID data group and a time stamp acquired from the clock generation unit 24 of the user authentication apparatus 10, that the decryption expiration time has passed, corresponds to another example of failure.

In step S45, the various ID collation unit 26 acquires the account name from the various ID data group supplied from the two-dimensional code detection and decoding unit 25 and supplies the acquired account name to the database 14.

In step S46, the database 14 inquires as to whether or not the account name supplied from the various ID collation unit 26 exists and notifies the user authentication determination unit 28 of the inquiry result. When the account name exists, the processing advances to step S47, and when the account name does not exist, the processing advances to step S52.

In step S47, the various ID collation unit 26 acquires the session ID from the various ID data group supplied from the two-dimensional code detection and decoding unit 25. Further, the various ID collation unit 26 acquires the session ID associated with the account name from the database 14 using the account name acquired in step S45 as a query key.

In step S48, the various ID collation unit 26 collates the session ID acquired from the various ID data group with the session ID from the database 14 and notifies the user authentication determination unit 28 of the collation result. When the collation result indicates that the session IDs match, the processing advances to step S49, and when the session IDs do not match, the processing advances to step S52.

The session ID is unique identification information generated at the time of user registration, and collectively identifies all user authentication processes relating to the user of the user authentication support terminal 50 having used at the time of user registration. Therefore, if the user loses the user authentication support terminal 50 having used at the time of user registration, for example, the user authentication apparatus 10 nullifies (sets as 0, for example) the session ID having generated at the time of user registration and stored in the database 14. As a result, when a spoof is performed by a third party using the user authentication support terminal 50 being lost, the spoof is prevented in step S48. Note that when a new user authentication support terminal 50 is desired to be used in place of the user authentication support terminal 50 having used at the time of user registration, another user registration process must be executed again.

In step S49, the various ID collation unit 26 acquires the data of the additional authentication factor associated with the account name from the database 14 using the account name acquired in step S45 as a query key, and supplies the acquired data to a predetermined collation unit (not shown) relating to the additional authentication factor.

Figure 11:
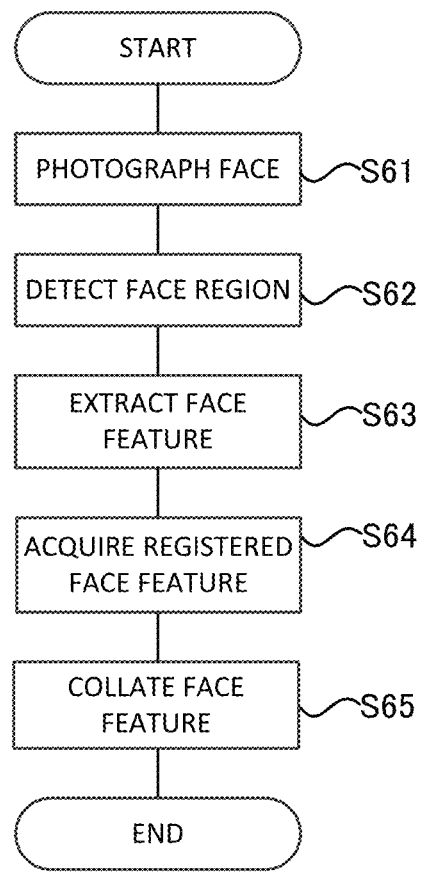
FIG. 11 is a flowchart showing specific processing executed in step S49 and step S50.

In step S50, the predetermined collation unit collates additional authentication factor data acquired by a predetermined method relating to the additional authentication factor with the additional authentication factor data supplied from the database 14 by the various ID collation unit 26, and notifies the user authentication determination unit 28 of the collation result. When the collation result indicates that the respective sets of additional authentication factor data match, the processing advances to step S51, and when the respective sets of additional authentication factor data do not match, the processing advances to step S52. Step S49 and step S50 are then executed repeatedly on all of the additional authentication factors. Note that when the additional authentication factor is face feature, specific processing shown in FIG. 11 is executed.

In step S52, the user authentication determination unit 28 determines an authentication result (authentication success or authentication denial) upon receipt of all of the notifications from the database 14, the various ID collation unit 26, and so on, and outputs the authentication result. More specifically, only when the account names, the session IDs, and the additional authentication factors all match, the user authentication determination unit 28 determines authentication success, and even when any one element among the account names, the session IDs, and one of the additional authentication factors does not match, the user authentication determination unit 28 determines authentication denial.

When authentication is successful, the user authentication apparatus 10 allows the user to log in to the login target PC. As a result, the user can log in to the login target PC in which the user authentication apparatus 10 is incorporated, and then the user can operate the PC freely.

When authentication is denied, the user authentication apparatus 10 prohibits the user from logging in to the login target PC. As a result, the user cannot log in to the login target PC in which the user authentication apparatus 10 is incorporated, and so the user cannot operate the PC.

FIG. 11 is a flowchart showing the specific processing executed in step S49 and step S50 of FIG. 10. More specifically, in step S49 and step S50, the following processing is executed when the additional authentication factor is face feature.

In step S61, the camera 21 of the user authentication apparatus 10 generates image data by photographing a face of the user.

In step S62, the face detection unit 22 detects a face region from the image data generated by the camera 21.

In step S63, the face feature extraction unit 23 extracts face feature from the face region of the image data.

In step S64, the various ID collation unit 26 acquires the face feature associated with the account name from the database 14 using the account name acquired in step S45 as a query key, and supplies the acquired face feature to the face feature collation unit 27.

In step S65, the face feature collation unit 27 collates the face feature supplied from the face feature extraction unit 23 with the face feature supplied from the database 14 by the various ID collation unit 26, and notifies the user authentication determination unit 28 of the collation result. When the collation result indicates that the face features match, the processing advances to step S51, and when the face features do not match, the processing advances to step S52.

Figure 12:
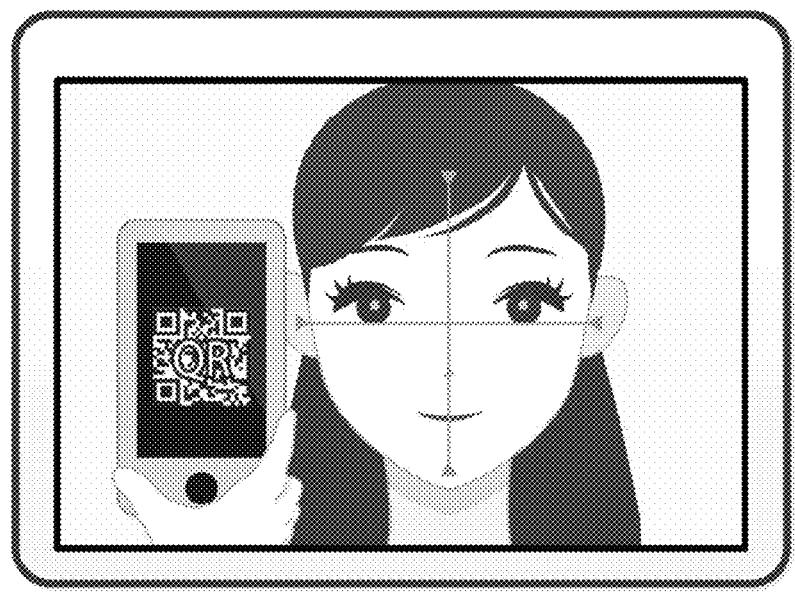
FIG. 12 is a pattern diagram of a photographed image taken by a camera of the user authentication apparatus.

FIG. 12 is a pattern diagram of a photographed image taken by the camera 21 of the user authentication apparatus 10.

The user authentication of this embodiment is constituted by two-step authentication processes, namely an authentication process relating to whether the user is in "possession" of the user authentication support terminal 50 registered in the user authentication apparatus 10 (first authentication process), which is realized by displaying a two-dimensional code such as a QR code (registered trademark), for example, on the display unit 57 of the user authentication support terminal 50, and a face authentication process (second authentication process), which is the user authentication by means of "biometrics" for specifying whether a user is the user registered in advance. Accordingly, the camera 21 of the user authentication apparatus 10 photographs the two-dimensional code during the first authentication process and photographs the face of the user during the following second authentication process.

Note, however, that in order to execute the first and second authentication processes efficiently, the camera 21 may photograph the two-dimensional code displayed on the user authentication support terminal 50 and the face of the user simultaneously, as shown in FIG. 12. In this case, the user authentication apparatus 10 executes the first authentication process and the second authentication process sequentially. By enabling the first and second authentication processes to be executed by a single photography operation in this manner, the burden on the user can be lightened.

Note that in this embodiment, face authentication, which is the user authentication by means of "biometrics", is used as the second authentication process, but the second authentication process is not limited to the face authentication. In other words, biometric authentication based on any biometric feature that can identify an individual and can be collated on the basis of image matching technology may be used. More specifically, any user authentication method relating to user "biometrics" from which individual users can be identified such as employing the iris, the retina, the vein, the fingerprint, the auricle of the ear, the shape of the palm, and so on may be used.

Second Embodiment

Next, a second embodiment will be described. Note that identical sites to the first embodiment have been allocated with identical reference numerals, and duplicate description thereof has been omitted.

The user authentication of the first embodiment is constituted by two-step authentication processes including not only an authentication process relating to whether the user is in "possession" of the user authentication support terminal 50 registered in the user authentication apparatus 10 (first authentication process), but also, as an additional authentication factor, a face authentication process (second authentication process), which is a type of the biometric authentication.

In the second embodiment, on the other hand, an authentication process of a spoken answer to a "secret question" and a voiceprint authentication process, which is another type of the biometric authentication, are used as additional authentication factors instead of the face authentication process. In other words, the user authentication of the second embodiment is constituted by three-step authentication processes including not only a similar first authentication process to the first embodiment, but also an authentication process of a spoken answer to a "secret question" (second authentication process), and a voiceprint authentication process (third authentication process).

Figure 13:
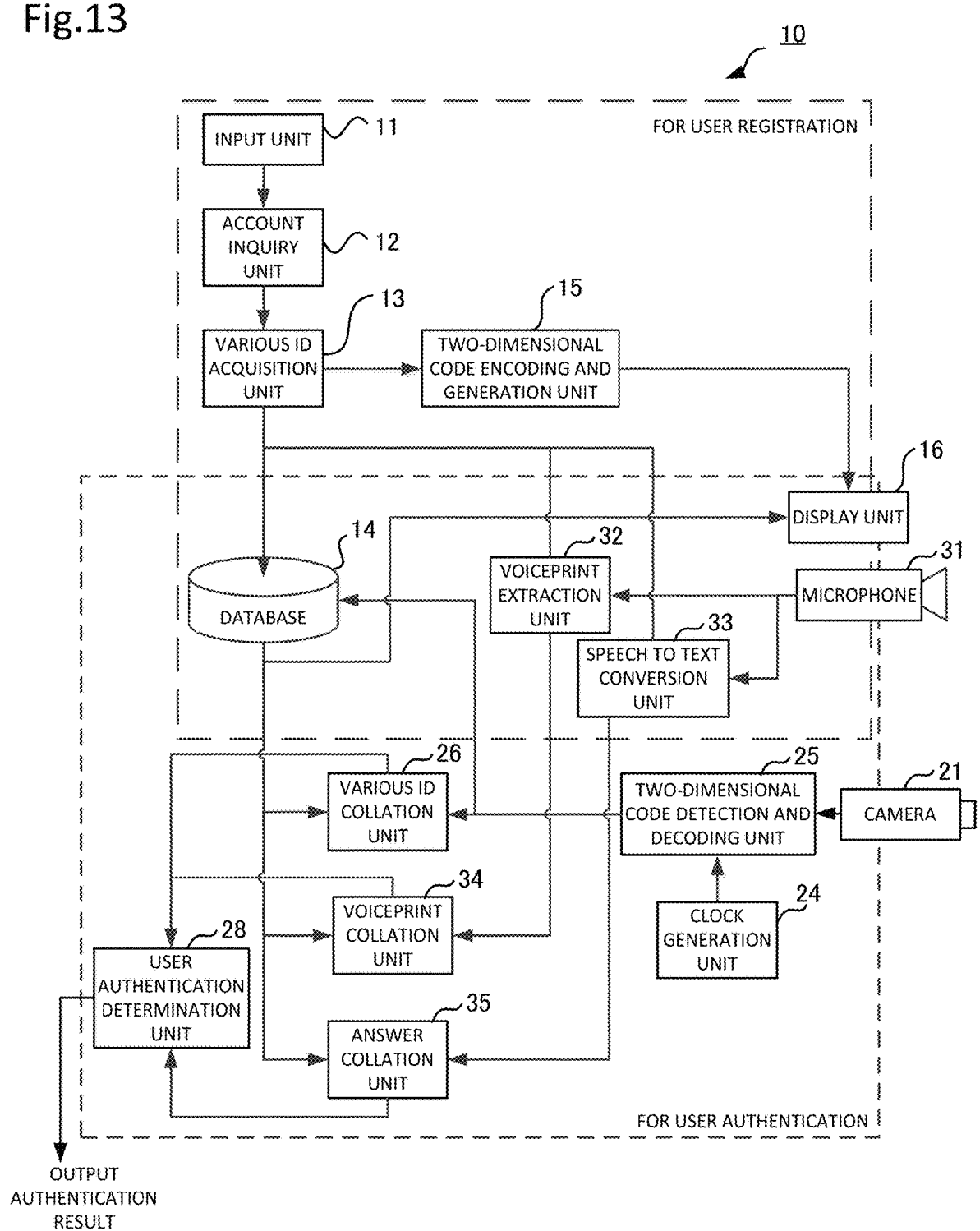
FIG. 13 is a block diagram showing a functional configuration of a user authentication apparatus according to a second embodiment.

FIG. 13 is a block diagram showing a functional configuration of the user authentication apparatus 10 according to the second embodiment.

At the time of user registration, the display unit 16 displays a two-dimensional code and text of a "secret question". At the time of user authentication, the display unit 16 displays the text of the "secret question" only.

A microphone 31 converts an answer speech spoken in response to the "secret question" into answer speech data and supplies the acquired answer speech data to both a voiceprint extraction unit 32 and a speech to text conversion unit 33.

The voiceprint extraction unit 32 extracts voiceprint data from the answer speech data supplied from the microphone 31. At the time of user registration, the voiceprint extraction unit 32 associates the voiceprint data with the account name and stores the result in the database 14, and at the time of user authentication, the voiceprint extraction unit 32 supplies the voiceprint data to a voiceprint collation unit 34.

The speech to text conversion unit 33 converts the answer speech data supplied from the microphone 31 into answer text data by performing a voice recognition and a language analysis processes. At the time of user registration, the speech to text conversion unit 33 associates the answer text data with the account name and stores the result in the database 14, and at the time of user authentication, the speech to text conversion unit 33 supplies the answer text data to an answer collation unit 35.

The voiceprint collation unit 34 collates the registered voiceprint data, which are acquired from the database 14 using the account name as a query key, with the voiceprint data supplied from the voiceprint extraction unit 32 at the time of user authentication, and notifies the user authentication determination unit 28 of the collation result.

The answer collation unit 35 collates the registered answer text data, which are acquired from the database 14 using the account name as a query key, with the answer text data supplied from the speech to text conversion unit 33 at the time of user authentication, and notifies the user authentication determination unit 28 of the collation result.

The user authentication determination unit 28 determines whether or not to permit user authentication upon receipt of the respective notifications from the database 14, the various ID collation unit 26, the voiceprint collation unit 34, and the answer collation unit 35, and outputs the authentication result to the outside.

Figure 14:
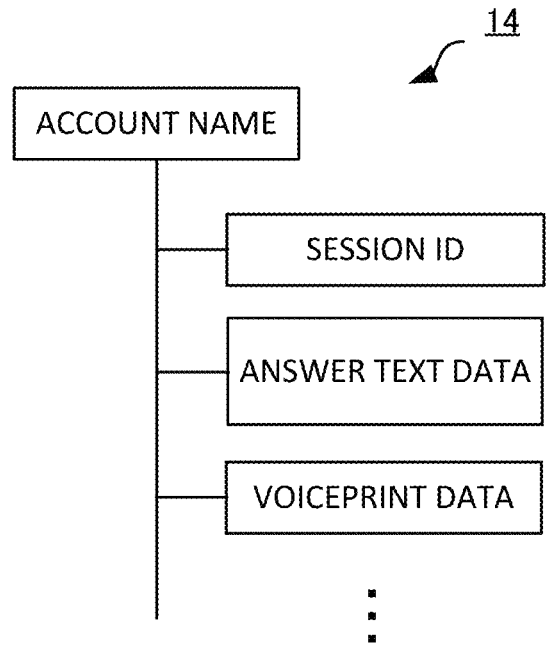
FIG. 14 is a schematic diagram showing a data structure of a database according to the second embodiment.

FIG. 14 is a schematic diagram showing a data structure of the database 14 according to the second embodiment.

In the second embodiment, the database 14 stores the account name and the session ID acquired by the various ID acquisition unit 13, the answer text data supplied from the speech to text conversion unit 33, and the voiceprint data supplied from the voiceprint extraction unit 32.

At the time of user registration, the database 14 stores the session ID supplied from the various ID acquisition unit 13, the answer text data supplied from the speech to text conversion unit 33, and the voiceprint data supplied from the voiceprint extraction unit 32 associatively in relation to the account name acquired by the various ID acquisition unit 13.

When, at the time of user authentication, the two-dimensional code detection and decoding unit 25 inquires as to an existence of the account name, the database 14 notifies the user authentication determination unit 28 of the inquiry result. Further, when the account name of the inquiry exists, the database 14 supplies the session ID associated with the account name to the various ID collation unit 26, and also supplies the voiceprint data and the answer text data, both of which are associated with the account name, to the voiceprint collation unit 34 and to the answer collation unit 35, respectively.

A data query is performed in the database 14 using the account name as the primary query key. Thus, even when a large number of users are registered for the authentication subject, it is possible to conduct an unambiguous, high-speed query.

The user authentication apparatus 10 and user authentication support terminal 50 configured as described above execute a user registration process in a similar manner to the first embodiment. Note, however, that the following processing is executed in relation to the additional authentication factors.

Figure 15:
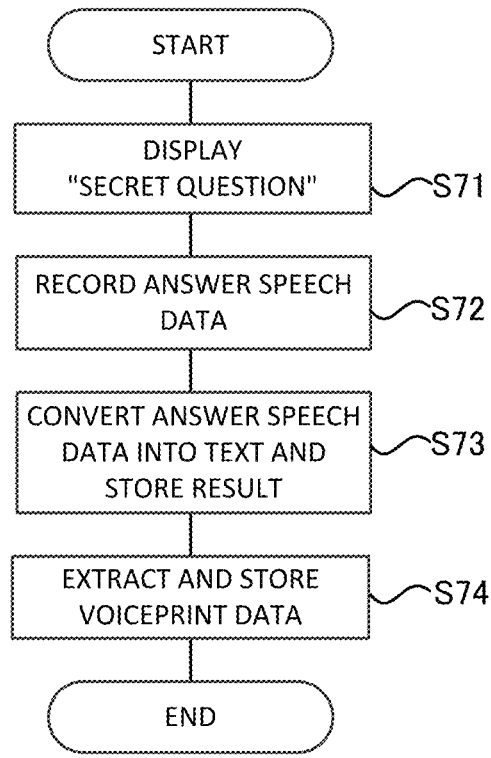
FIG. 15 is a flowchart showing the specific processing of step S6 in a case where an additional authentication factor is a spoken answer to a "secret question".

FIG. 15 is a flowchart showing the specific processing executed in step S6 of FIG. 5 in a case where the additional authentication factor is an answer to a "secret question".

In step S71, the display unit 16 of the user authentication apparatus 10 displays the "secret question" and prompts the user for an answer. Note that in this embodiment, one "secret question" is displayed by the display unit 16, but a plurality of "secret questions" may be displayed. In the latter case, the user may be prompted to select one of the plurality of "secret questions".

In step S72, the microphone 31 records answer speech data spoken by the user.

In step S73, the speech to text conversion unit 33 converts the answer speech data acquired by the microphone 31 into text, associates the acquired answer text data with the account name, and stores the result in the database 14.

In step S74, the voiceprint extraction unit 32 extracts voiceprint data from the speech data acquired by the microphone 31, associates the acquired voiceprint data with the account name, and stores the result in the database 14.

Further, the user authentication apparatus 10 and user authentication support terminal 50 execute a user authentication process in a similar manner to the first embodiment. Note, however, that the following processing is executed in relation to the additional authentication factors.

Figure 16:
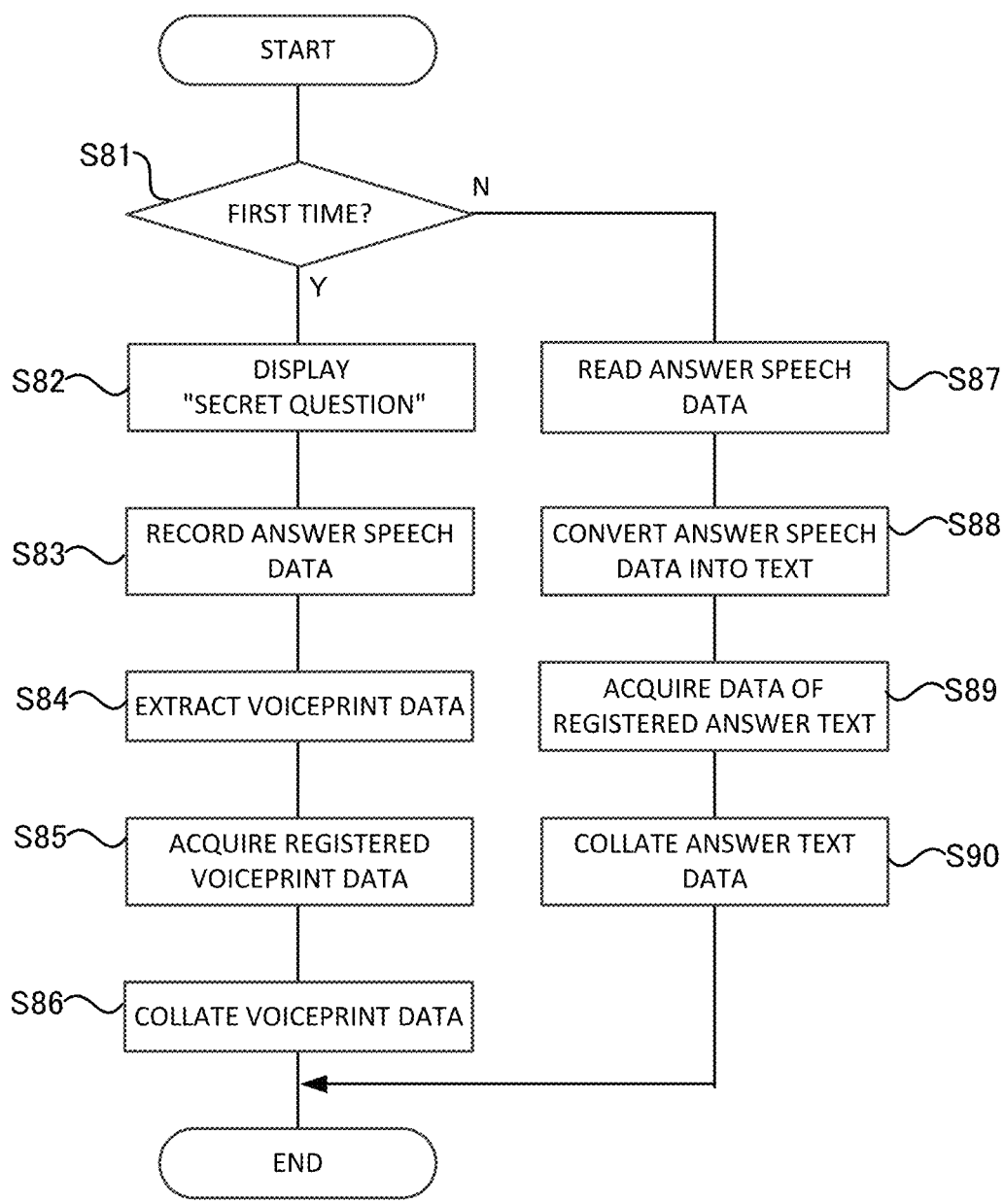
FIG. 16 is a flowchart showing the specific processing of step S49 and step S50 in a case where the additional authentication factor is a spoken answer to a "secret question".

FIG. 16 is a flowchart showing the specific processing executed in step S49 and step S50 of FIG. 10 in a case where the additional authentication factor is an answer to a "secret question".

In step S81, a determination is made as to whether or not the additional authentication process is being executed for the first time. When the additional authentication process is being executed for the first time, the processing advances to step S82, and when the additional authentication process is not being executed for the first time, the processing advances to step S87.

In step S82, the display unit 16 of the user authentication apparatus 10 displays the "secret question" and prompts the user for an answer.

In step S83, the microphone 31 records spoken words by the user as answer speech data.

In step S84, the voiceprint extraction unit 32 extracts voiceprint data from the answer speech data.

In step S85, the various ID collation unit 26 acquires the voiceprint data associated with the account name from the database 14 using the account name acquired in step S45 as a query key, and supplies the acquired voiceprint data to the voiceprint collation unit 34.

In step S86, the voiceprint collation unit 34 collates the voiceprint data supplied from the voiceprint extraction unit 32 with the voiceprint data supplied from the database 14 by the various ID collation unit 26 and notifies the user authentication determination unit 28 of the collation result.

In step S87, on the other hand, the answer speech data recorded in step S83 are read.

In step S88, the speech to text conversion unit 33 generates answer text data by converting the answer speech data into text.

In step S89, the various ID collation unit 26 acquires the answer text data associated with the account name from the database 14 using the account name acquired in step S45 as a query key, and supplies the acquired answer text data to the answer collation unit 35.

In step S90, the answer collation unit 35 collates the answer text data supplied from the speech to text conversion unit 33 with the answer text data supplied from the database 14 by the various ID collation unit 26 and notifies the user authentication determination unit 28 of the collation result.

Note that in this embodiment, voiceprint authentication, which is the user authentication by means of "biometrics", is used as the second authentication process, but the second authentication process is not limited to the voiceprint authentication. In other words, biometric authentication based on any biometric feature that can identify an individual and that is extracted when an answer is provided to a "secret question" may be used.

For example, a handwriting input device, a handwritten character recognition unit, and a handwriting feature extraction unit may be used respectively in place of the microphone 31, the speech to text conversion unit 33, and the voiceprint extraction unit 32. In other words, a handwritten answer (for example, a signature or the like) may be used in place of a spoken answer.

Third Embodiment

Next, a third embodiment will be described. Note that identical sites to the above embodiments have been allocated with identical reference numerals, and duplicate description thereof has been omitted.

Figure 17:
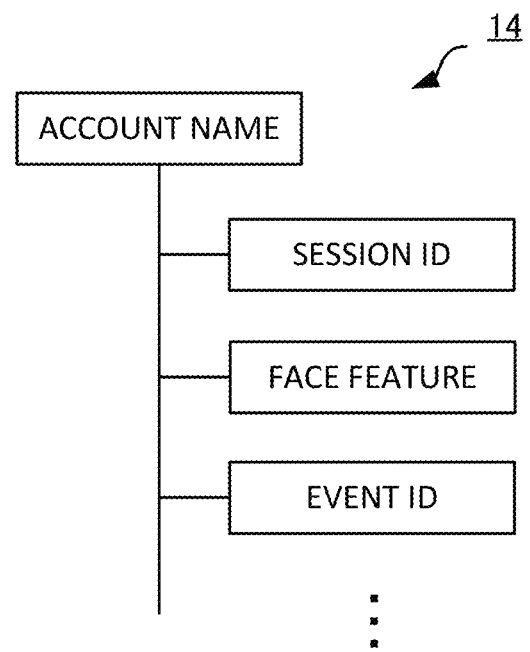
FIG. 17 is a schematic diagram showing a data structure of a database according to a third embodiment.

FIG. 17 is a schematic diagram showing a data structure of the database 14 according to the third embodiment.

In the database 14 of the first embodiment, as shown in FIG. 3, the session ID and the face feature are stored together with an account name as the various data associated with the account name serving as a primary query key.

In the database 14 of the third embodiment, on the other hand, as shown in FIG. 17, an event ID is stored in addition to the session ID and the face feature as the various data associated with the account name. The event ID is identification information uniquely identifying individual processes of user registration and user authentication.

(User Registration Process at the User Authentication Apparatus 10)

In the user registration process, the user authentication apparatus 10 executes similar processing to that of FIG. 5. Note, however, that the user authentication apparatus 10 executes step S4 and step S5 as follows using the event ID.

In step S4, the various ID acquisition unit 13 generates a session ID and an event ID, and stores the session ID and the event ID in the database 14 in association with the account name serving as the primary query key.

In step S5, the two-dimensional code encoding and generation unit 15 reads a license code from the database 14, generates a various ID data group gathering together the account name, the session ID, the event ID, and the license code into one, and generates two-dimensional code image data by encoding the generated various ID data group into a two-dimensional code. The display unit 16 displays the two-dimensional code based on the two-dimensional code image data generated by the two-dimensional code encoding and generation unit 15.

(User Registration Process at the User Authentication Support Terminal 50)

In the user registration process, the user authentication support terminal 50 executes similar processing to that of FIG. 6. Note, however, that the user authentication support terminal 50 executes step S12 and step S13 as follows using the event ID.

In step S12, the two-dimensional code detection and decoding unit 52 generates a various ID data group (comprising the account name, the session ID, the event ID, and the license code) by detecting and decoding the two-dimensional code based on the image data acquired by the camera 51.

In step S13, the various ID acquisition unit 53 extracts the account name, the session ID, the event ID, and the license code from the various ID data group supplied from the two-dimensional code detection and decoding unit 52, and stores the extracted account name, session ID, event ID, and license code in the storage unit 54.

(User Authentication Process)

In this embodiment, the event ID is also used in the user authentication process.

Figure 18:
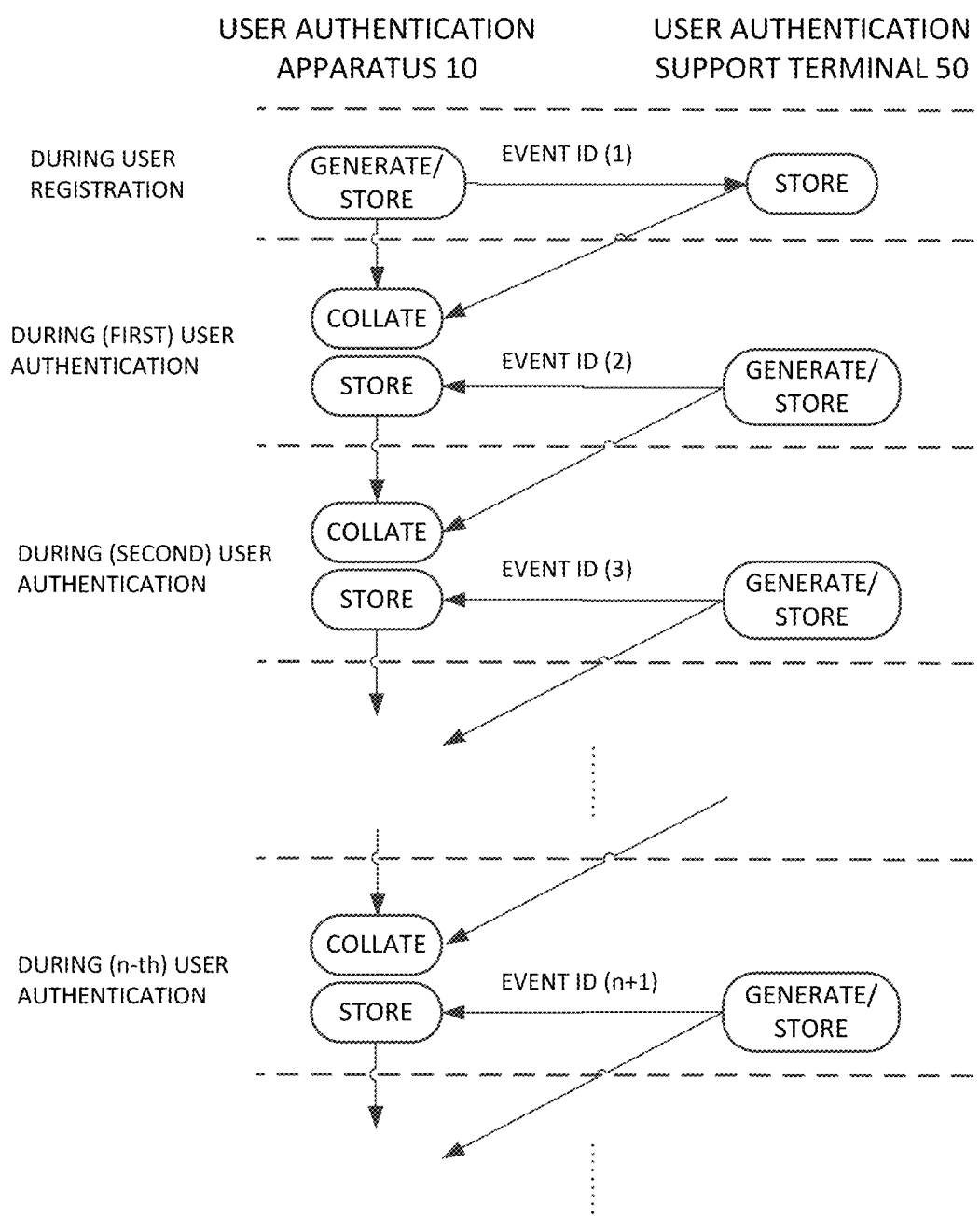
FIG. 18 is an illustrative view of a user authentication process using an event ID.

FIG. 18 is an illustrative view of a user authentication process using the event ID. An n($\geq$1)-th user authentication process is executed as follows.

(n-Th User Authentication Process)

The user authentication support terminal 50 generates an event ID (n+1) separately to the event ID stored in the storage unit 54 (an event ID (n), for example). Here, an event ID (1) is the event ID stored by the user authentication support terminal 50 in the storage unit 54 in step S13 of the user registration process shown in FIG. 6.

By executing the processing of steps S31 to S33 shown in FIG. 8, the user authentication support terminal 50 displays a two-dimensional code including information relating to the event ID (n) for the current user authentication and the event ID (n+1) for the next user authentication.

The user authentication apparatus 10, on the other hand, executes the user authentication process in a similar manner to that shown in FIGS. 9 and 10. More specifically, the user authentication apparatus 10 acquires the various ID data group (comprising an account name, a session ID, an event ID (n), and an event ID (n+1)) from the two-dimensional code displayed on the display unit 57 of the user authentication support terminal 50 by photographing the two-dimensional code (steps S41 to S44).

When all the decryption of an encrypted various ID data group, the account name inquiry, and the session ID collation are successfully done (steps S45 to S48), the user authentication apparatus 10 collates event IDs (n), and then executes the remaining processing of steps S49 to S52.

More specifically, the various ID collation unit 26 of the user authentication apparatus 10 acquires the event ID (n) from the various ID data group supplied from the user authentication support terminal 50. Further, the various ID collation unit 26 acquires from the database 14 another event ID (n) that was previously supplied from the user authentication support terminal 50 and stored in the database 14 in association with the account name during last user authentication, using the account name as a query key. Note that the event ID (1) acquired by the various ID collation unit 26 from the database 14 during the first user authentication was generated by the user authentication apparatus 10 itself (by the various ID acquisition unit 13), stored in the database 14 in association with the account name serving as the primary query key in step S4 of FIG. 5, and supplied to the user authentication support terminal 50 in steps S11 to S13 of FIG. 6, during the user registration process.

Next, the various ID collation unit 26 collates the event ID (n) acquired from the various ID data group with the other event ID (n) from the database 14 and notifies the user authentication determination unit 28 of the collation result. When the collation result indicates that both the event IDs (n) match, the processing advances to step S49, and when both the event IDs (n) do not match, the processing advances to step S52. Steps S49 to S52 are then executed in a similar manner to the first embodiment.

Next, the user authentication apparatus 10 (the various ID collation unit 26) acquires the event ID (n+1) from the various ID data group and stores the acquired event ID (n+1) in the database 14 in association with the account name by overwriting an existing event ID (n) previously stored in the database 14. As a result, the event ID (n) stored in the database 14 is updated to the event ID (n+1).

On the other hand, the user authentication support terminal 50 (the various ID acquisition unit 53) also stores the generated event ID (n+1) in the storage unit 54 by overwriting an existing event ID (n).

The user authentication process is executed by the user authentication apparatus 10 as described above, with a result that the event IDs (n) stored in the user authentication apparatus 10 and in the user authentication support terminal 50 are updated to the event IDs (n+1), and at that point, the n-th user authentication process is completed.

Hence, in the user authentication process of the third embodiment, the event ID acquired and stored in the user authentication apparatus 10 either during the user registration process or during the previous user authentication process is collated with the event ID supplied from the user authentication support terminal 50. Accordingly, in the user authentication process of the third embodiment, the user is required to use the same user authentication support terminal 50 as that used previously.

In step S11 of the user registration process shown in FIG. 6, in principle, a plurality of user authentication support terminals used for backup or the like can be registered simultaneously instead of only a single main user authentication support terminal 50 being registered. In the first embodiment, if one of the backup user authentication support terminals 50 passes into the hands of a third party, for example, the third party can successfully complete the user authentication using the backup user authentication support terminal 50 together with, for example, a photographed face image of the user.

In the third embodiment, however, at each user authentication, the event IDs stored in the user authentication apparatus 10 and in the user authentication support terminal 50 during the previous user authentication are collated, and therefore user authentication cannot be completed successfully using a backup user authentication support terminal 50 that was not used in the previous user authentication.

On the other hand, in the third embodiment, the backup user authentication support terminals 50 can be handled safely. Note that if the user authentication support terminal 50 used in the previous user authentication passes into the hands of a third party, the user authentication apparatus 10 may omit the step of collating the event IDs (n) for the user authentication of a genuine user by, for example, confirming an existence of an account corresponding to the login information (the login name and password) being used during the user registration process of the genuine user.

In this case, the user authentication apparatus 10 omits the step of collating the event IDs (n) only for the current user authentication of the genuine user who knows the login information while the backup user authentication support terminal 50 is in use, which results in storing the event ID (n+1) in the user authentication apparatus 10 and in the backup user authentication support terminal 50 after the user authentication process of the genuine user. As a result, the backup user authentication support terminal 50 can be used as the main user authentication support terminal 50 from the next user authentication onward, instead of executing special processing such as nullifying the session ID in the database 14 of the user authentication apparatus 10 thereof.

The present invention is not limited to the embodiments described above and may also be applied in the following configurations, for example.

The database 14 does not have to exist in the login target PC into which the user authentication apparatus 10 is incorporated. For example, the database 14 may exist in an external server in which the database 14 can be accessed.

The present invention is not limited to a configuration in which the account name is used as first identification information, e. g., an account GUID (Globally Unique IDentifier) that is generated when an account is created and can uniquely identify the account both temporally and spatially may be used instead. Needless to mention, the first identification information may also be an employee number or the like.

The present invention is not limited only to PC login authentication and may be applied to any object requiring user authentication. For example, the present invention may also be applied to a room entry/exit management apparatus disposed at an entrance to a secret room in which confidential information is managed in order to manage entry and exit to and from the secret room.

The invention claimed is:

1. A user authentication apparatus comprising:
    a photographing unit which photographs a two-dimensional code displayed on a user authentication support terminal possessed by a user serving as an authentication subject, wherein the two-dimensional code is formed by encoding at least first identification information that uniquely identifies the user, and second identification information that is related to registration of the user authentication support terminal and uniquely identifies a user authentication performed using the user authentication support terminal collectively, into the two-dimensional code;
    an authentication factor acquisition unit which acquires an authentication factor that differs from both the first identification information and the second identification information;
    a decoding unit which acquires the first identification information and the second identification information by decoding the two-dimensional code;
    a first identification information inquiry unit which inquires as to an existence of the first identification information by referring to a storage unit that stores, for the user, first identification information, an authentication factor associated with the first identification information, and second identification information associated with the first identification information;
    a second identification information collation unit which, when the inquiry issued by the first identification information inquiry unit is successful, reads from the storage unit the second identification information associated with the first identification information acquired by the decoding unit, and collates the second identification information acquired by the decoding unit with the second identification information read from the storage unit;
    an authentication factor collation unit which, when the inquiry issued by the first identification information inquiry unit is successful, reads from the storage unit the authentication factor associated with the first identification information acquired by the decoding unit, and collates the authentication factor acquired by the authentication factor acquisition unit with the authentication factor read from the storage unit; and
    a determination unit which determines that authentication of the user has been performed successfully when the collations performed by both the second identification information collation unit and the authentication factor collation unit are successful.

2. The user authentication apparatus according to claim 1, wherein, when the authentication factor is a face feature value, the photographing unit photographs both the face of the user and the two-dimensional code either simultaneously or sequentially, and
    wherein the authentication factor acquisition unit acquires the face feature value based on a face image of the user, photographed by the photographing unit.

3. The user authentication apparatus according to claim 1, wherein the authentication factor acquisition unit acquires a plurality of authentication factors,
    wherein, when the inquiry issued by the first identification information inquiry unit is successful, the authentication factor collation unit reads from the storage unit all of the authentication factors associated with the first identification information acquired by the decoding unit, and collates all of the authentication factors acquired by the authentication factor acquisition unit with all of the respectively corresponding authentication factors read from the storage unit, and wherein the determination unit determines that authentication of the user has been performed successfully when the collation performed by the second identification information collation unit and all of the collations performed by the authentication factor collation unit are successful.

4. The user authentication apparatus according to claim 1, further comprising a second identification information nullification unit which nullifies the second identification information associated with specific first identification information stored in the storage unit.

5. The user authentication apparatus according to claim 1, further comprising:
- a third identification information collation unit; and
- a third identification information generation unit which, during the registration of the user authentication support terminal, generates initial third identification information uniquely identifying each user authentication process executed to determine authentication of the user, wherein the photographing unit photographs the two-dimensional code which is formed by additionally encoding third identification information generated either by the third identification information generation unit or by the user authentication support terminal into the two-dimensional code and which is displayed by the user authentication support terminal, wherein the decoding unit additionally acquires the third identification information by decoding the two-dimensional code photographed by the photographing unit, wherein the storage unit additionally stores, for the user, the third identification information which is associated with the first identification information, wherein, when the inquiry issued by the first identification information inquiry unit is successful, the third identification information collation unit reads from the storage unit the third identification information associated with the first identification information acquired by the decoding unit, and collates the third identification information acquired by the decoding unit with the third identification information read from the storage unit, and wherein the determination unit determines that authentication of the user has been performed successfully when all the collation performed by the second identification information collation unit, all of the collations performed by the authentication factor collation unit, and the collation performed by the third identification information collation unit are successful.

6. The user authentication apparatus according to claim 5, wherein, during first user authentication of the user, the user authentication support terminal generates third identification information for uniquely identifying second user authentication to be performed after the first user authentication of the user, stores the third identification information in the user authentication support terminal itself, and lets the user authentication apparatus store the third identification information in the storage unit.

7. The user authentication apparatus according to claim 5, wherein, when first identification information and second identification information are stored in a plurality of user authentication support terminals, and when, among the plurality of the user authentication support terminals, a different user authentication support terminal from a user authentication support terminal used during past user authentication is used, the determination unit determines that authentication of the user has been performed successfully even when only the collation performed by the second identification information collation unit and all of the collations performed by the authentication factor collation unit are successful, provided that another predetermined user authentication that differs from any of the collations performed by the second identification information collation unit or by the authentication factor collation unit is also successful.

8. The user authentication apparatus according to claim 1, wherein the two-dimensional code is a QR code.

9. A non-transitory computer readable medium having recorded thereon a program for causing a computer to function as the respective units of the user authentication apparatus according to claim 1.

* * * * *